US010689267B2

(12) United States Patent
Essandoh et al.

(10) Patent No.: US 10,689,267 B2
(45) Date of Patent: Jun. 23, 2020

(54) METHOD FOR REMOVING ORGANIC DYES FROM WATER USING A HEMOGLOBIN/FE₃O₄ COMPOSITE ADSORBENT

(71) Applicant: The United States of America, as Represented by the Secretary of Agriculture, Washington, DC (US)

(72) Inventors: Matthew Essandoh, Philadelphia, PA (US); Rafael A. Garcia, Dresher, PA (US)

(73) Assignee: The United States of America, as represented by the Secretary of Agriculture, Washington, DC (US)

( * ) Notice: Subject to any disclaimer, the term of this patent is extended or adjusted under 35 U.S.C. 154(b) by 374 days.

(21) Appl. No.: 15/423,955

(22) Filed: Feb. 3, 2017

(65) Prior Publication Data
US 2018/0222773 A1  Aug. 9, 2018

(51) Int. Cl.
*C02F 1/28* (2006.01)
*B01J 20/22* (2006.01)
*B01J 20/06* (2006.01)
*B01J 20/30* (2006.01)
*C02F 101/30* (2006.01)
*C02F 101/20* (2006.01)
(Continued)

(52) U.S. Cl.
CPC .............. *C02F 1/288* (2013.01); *B01J 20/06* (2013.01); *B01J 20/223* (2013.01); *B01J 20/3085* (2013.01); *B01J 20/24* (2013.01); *B01J 20/28009* (2013.01); *C02F 1/281* (2013.01); *C02F 1/285* (2013.01); *C02F 1/286* (2013.01); *C02F 2101/20* (2013.01); *C02F 2101/306* (2013.01); *C02F 2101/308* (2013.01)

(58) Field of Classification Search
CPC .......... C02F 1/281; C02F 1/285; C02F 1/286; C02F 1/288; C02F 2101/308; C02F 2101/20; C02F 2101/306; B01J 20/06; B01J 20/223; B01J 20/3085; B01J 20/24; B01J 20/28009
See application file for complete search history.

(56) References Cited

U.S. PATENT DOCUMENTS

| | | | |
|---|---|---|---|
| 3,803,033 A * | 4/1974 | Sutherland | B01D 15/08 210/673 |
| 2013/0168321 A1 * | 7/2013 | Cannon | B01J 20/20 210/684 |

OTHER PUBLICATIONS

Zhu et al, Electro-enzymatic degradation of carbofuran with the graphene oxide-FeO4-hemoglobin composite in an electrochemical reactor, Oct. 2012, Process Biochemistry, vol. 47, pp. 2480-2486. (Year: 2012).*

(Continued)

*Primary Examiner* — Matthew O Savage
(74) *Attorney, Agent, or Firm* — John D. Fado; G. Byron Stover

(57) ABSTRACT

Disclosed are methods to remove organic and/or inorganic compounds (e.g., contaminants) from water containing organic and/or inorganic compounds, involving contacting the water with an effective organic and/or inorganic compounds removing amount of hemoglobin/Fe₃O₄ composite where the compounds in the water adsorb onto the hemoglobin/Fe₃O₄ composite, and removing (e.g., using a magnet since the composite is magnetic) the hemoglobin/Fe₃O₄ composite from the water.

3 Claims, 8 Drawing Sheets

(51) Int. Cl.
  *B01J 20/28* (2006.01)
  *B01J 20/24* (2006.01)

(56) References Cited

OTHER PUBLICATIONS

Tayyebeh Madrakian et al, Adsorption and Kinetic studies of seven different organic dyes onto magnetite nanoparticles loaded with tea waste and removal of them from wastewater samples, Sep. 2012, Spectrochimica Acta Part A: Molecular and Bimolecular Spectroscopy, vol. 90, pp. 102-109. (Year: 2012).*
Poedji Loekitowati Hariani et al, Synthesis and properties of Fe3O4 Nanoparticles by Co-precipitation Method to remove Procion Dye, Jun. 2013, International Journal of Environmental Science and Development, vol. 4, No. 3, 5 pages. (Year: 2013).*
Liu, Ting-Yu et al., First Observation of Physically Capturing and Maneuvering Bacteria using Magnetic Clays, ACS Appl. Mater. Interfaces, (2016), 8:411-418.
Robati, D. et al., Removal of hazardous dyes-BR 12 and methyl orange using graphene oxide as an adsorbent from aqueous phase, Chemical Engineering Journal, (2016), 284:687-697.
Wang, Jianhao et al., Unique self-assembly properties of a bridge-shaped protein dimer with quantum dots, (2013), J Nanopart Res, 15(1914):1-11.

* cited by examiner

Tartrazine

Naphthol blue black

Erythrosine

Bromophenol blue

Eriochrome black T

Indigo carmine

METHOD FOR REMOVING ORGANIC DYES FROM WATER USING A HEMOGLOBIN/FE$_3$O$_4$ COMPOSITE ADSORBENT

BACKGROUND OF THE INVENTION

Disclosed are methods to remove organic and/or inorganic compounds (e.g., contaminants) from water containing organic and/or inorganic compounds, involving contacting the water with a hemoglobin/Fe$_3$O$_4$ composite where the compounds in the water adsorb onto the hemoglobin/Fe$_3$O$_4$ composite, and removing (e.g., using a magnet since the composite is magnetic) the hemoglobin/Fe$_3$O$_4$ composite from the water.

Dyes are used in a variety of industries including paper, paint, textile, and leather manufacture (Hashem, A., et al., Energy Edu. Sci. Technol., 19: 69-86 (2007)). Dye-contaminated wastewater from textile plants is recognized as one of the most polluting industrial wastewater, especially considering the amount of water used and the content of the discharge effluent (Chequer, F. M. D., et al., Textile dyes: dyeing process and environmental impact, 2013: INTECH Open Access Publisher). Wastewater from these industries show a lot of variations in wastewater characteristics such as biochemical oxygen demand (BOD), color intensity, and chemical oxygen demand (COD). It has been reported that a significant amount of synthetic dyes (about 12%) used in the manufacturing and processing operations are lost, and roughly 20% of these lost dyes find their way into industrial wastewaters (Weber, E. J., et al., Water Res., 27: 63-67 (1993); Clarke, E. A., et al., Organic dyes and pigments, 181-215 (1980)). Even low concentration of dyes in effluents from the dye industries significantly decrease the clarity of water and are highly undesirable (Nigam, P., et al., Bioresour. Technol., 72: 219-226 (2000)). The dyes in effluents are of primary concern because of their harmful effects in the environment and also to humans (Robinson, T., et al., Bioresour. Technol., 77: 247-255 (2001)). Unfortunately, because of their high stability to temperature, detergents, and light, just to name a few, they elude most conventional treatment technologies.

Dye contaminated wastewater can be treated with adsorbents. Recently, various authors have used different adsorbents to remove various dyes from aqueous solutions with varying degrees of success (Robati, D., et al., Chem. Eng. J., 284: 687-697 (2016); S. Dhananasekaran, S., et al., J. Adv. Res., 7: 113-124 (2016); Gautam, R. K., et al., J. Environ. Chem. Eng., 3: 79-88 (2015)). Most of the commonly used adsorbents are very high-priced, are hard to recover and recycle, and above all suffer from high activation and reactivation costs. However, we considered hemoglobin (Hb), a globular protein, which is a substance that is inexpensive and may have good properties that will cause organic and/or inorganic compounds (e.g., dyes) to adsorb to Hb. Hb has both positive and negative charges on its surface and therefore may serve as a good candidate for it attachment or attraction to other compounds. Annually, approximately 2 million tons of animal blood are produced in the US as a by-product from slaughterhouses (Del Hoyo, P., et al., Meat Sci., 76: 402-410 (2007)). Most of this blood is used in relatively low value animal feed applications or the blood may end up polluting the water that is being discharged into a wastewater stream. However, hemoglobin (Hb) can easily be isolated from blood and we found it can be used as a starting material for the preparation of hemoglobin/iron oxide composite, thereby minimizing agricultural waste. This will also serve as a good way of converting waste into useful products.

Magnetic particles (particles which show response to magnetic field gradients) exist in different sizes and shapes. Among the various magnetic particles, iron oxide magnetic particles have received considerable attention, and currently are the only magnetic particle type approved for clinical use in the United States (Neuberger, T., et al., J. Magn. Magn. Mater., 293: 483-496 (2005)). Magnetic particles have found a lot of applications including biosensing (Diez, P., et al., J. Colloid Interface Sci., 386: 181-188 (2012)), magnetic storage media (Reiss, G., and A. Hutten, Nat. Mater., 4: 725-726 (2005)), and biomedical applications such as drug delivery and multi-imaging (Lee, J.-H., et al., Mol. Cells, 35: 274-284 (2013)). A nanohybrid, consisting of magnetite attached to exfoliated silica platelets, has been developed for attracting bacteria in microbiological media (Liu, T.-Y., et al., ACS Appl. Mater. Interfaces, 8: 411-418 (2016)). The magnetite attached to silicate platelets greatly helps in the capturing and destruction of the bacterial cells, and subsequently removing them using an external magnet. These broad applications of magnetic nanoparticles are mainly as a result of their non-toxicity, biodegradability, and ease of synthesis (Wiogo, H. T., et al., Langmuir, 28: 4346-4356 (2012)). Magnetized compounds utilized in magnetic separation offers a unique advantage when it comes to the recovery of the spent separating agent because of the ease of separation. Despite advances in magnetic nanoparticles, not all sectors have come to appreciate the importance and other potential applications of magnetic substances. We found that the syntheses of hemoglobin/iron oxide composite is highly practical because hemoglobin can easily be isolated from blood (a meat processing by-product), and incorporating the magnetic properties of magnetite will enhance its recovery from aqueous wastewater. This is therefore an innovative way of converting waste in to a value-added product of commercial importance.

Herein we show how co-precipitation of Hb and iron oxide can produce a novel composite material (Hb/Fe$_3$O$_4$) that surprisingly exhibits good adsorption properties for organic and/or inorganic compounds, and has highly beneficial properties for recovery and re-use of the composite. We also provide details regarding the morphology, thermal stability, and adsorption properties of the novel hemoglobin/iron oxide composite (Hb/Fe$_3$O$_4$) and it application for the removal of organic and/or inorganic compounds from aqueous solutions.

SUMMARY OF THE INVENTION

Disclosed are methods to remove organic and/or inorganic compounds (e.g., contaminants) from water containing organic and/or inorganic compounds, involving contacting the water with an effective organic and/or inorganic compounds removing amount of hemoglobin/Fe$_3$O$_4$ composite where the compounds in the water adsorb onto the hemoglobin/Fe$_3$O$_4$ composite, and removing (e.g., using a magnet since the composite is magnetic) the hemoglobin/Fe$_3$O$_4$ composite from the water.

This summary is provided to introduce a selection of concepts in a simplified form that are further described below in the detailed description. This summary is not intended to identify key features or essential features of the

DETAILED DESCRIPTION OF THE INVENTION

Figure 1:
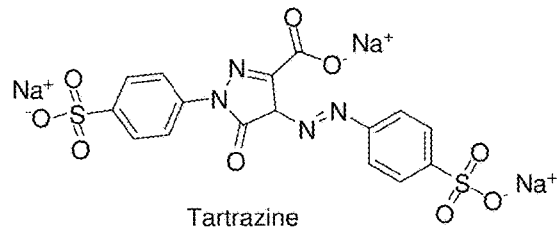
FIG. 1 shows the structures of the dyes as described below.
Figure 1:
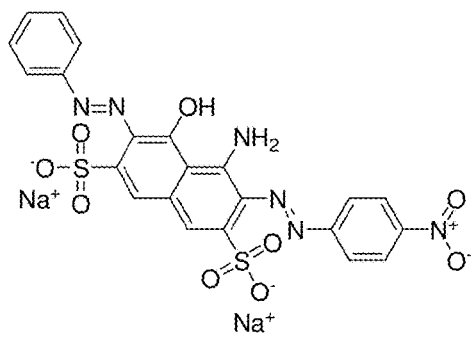
Figure 1:
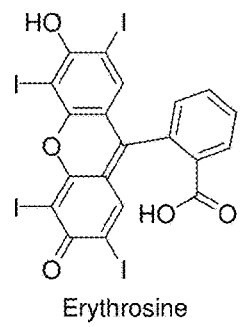
Figure 1:
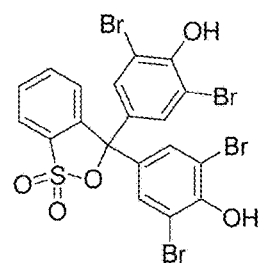
Figure 1:
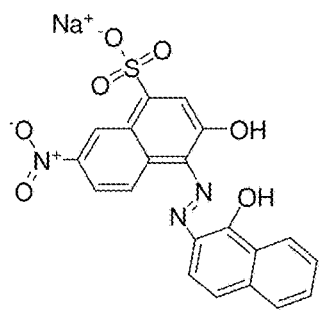
Figure 1:
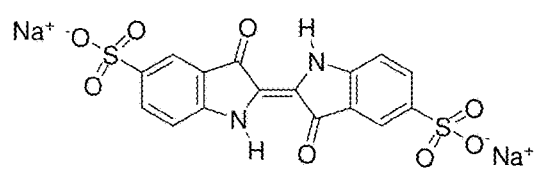

Disclosed are methods to remove organic and/or inorganic compounds (e.g., contaminants) from water containing organic and/or inorganic compounds, involving contacting the water with an effective organic and/or inorganic compounds removing amount of hemoglobin/Fe$_3$O$_4$ composite (adsorbent) where the compounds in the water adsorb onto the hemoglobin/Fe$_3$O$_4$ composite, and removing (e.g., using a magnet since the composite is magnetic) the hemoglobin/Fe$_3$O$_4$ composite from the water. The composite acts as an adsorbent. The pH of the water generally has a pH of about 4 to about 9 (e.g., 4 to 9), but the method works at any pH.

We report herein the synthesis, morphology, thermal stability, and adsorption properties of our novel hemoglobin/iron oxide composites (Hb/Fe$_3$O$_4$) and its application for the removal of organic and/or inorganic compounds (e.g., contaminants such as major industrial dyes like eriochrome black T, indigo carmine, naphthol blue black, erythrosine, tartrazine and bromophenol blue) from aqueous solution.

The organic compounds include, for example, organic dyes such as azo (e.g., tartrazine, eriochrome black T), diazo (e.g., naphthol blue black), arylmethane (e.g., bromophenol blue), xanthene (e.g., erythrosine or erythrosin B), and indole dyes (e.g., indigo carmine). Other organic compounds include, for example, pesticides like organophosphorus, triazine, and organochlorine compounds used in the agricultural sector.

The inorganic compounds include, for example, heavy metals such as lead or cadmium.

The hemoglobin/Fe$_3$O$_4$ composites have magnetic properties which are useful for removing/recovering spent adsorbent from water, and also for regenerating/recycling the adsorbent. Our composite is the first protein-based adsorbent with magnetic properties. The composite does not involve attaching prepared magnetic particles to some other adsorbent material. When preparing the composite, the magnetic particles and the hemoglobin precipitate out of solution together, forming particles that have Fe$_3$O$_4$ and Hb interspersed in the particles. Hb by itself does not act as an adsorbent.

The percentage of organic and/or inorganic compounds that can be removed from water depends on the dose of adsorbent one uses. For example, with the contaminant substances we tested below, more than 95% of the contaminants (100-200 mg/L) can be removed from aqueous solution with just an adsorbent dose of 2 g/L. Generally, about 0.003 to about 0.06 g (e.g., 0.003-0.06 g) adsorbent is used per mg contaminant in the water, preferably about 0.015 to about 0.04 g/mg (e.g., 0.015 to 0.04 g/mg), more preferably 0.075-0.02 g/mg (e.g., 0.075 to 0.02 g/mg).

The hemoglobin/Fe$_3$O$_4$ composite may generally be prepared, for example, by a process involving adding hemoglobin to an aqueous solution containing Fe$^{3+}$ and Fe$^{2+}$ salts (e.g., ferric sulfate and ferrous sulfate in 2:1 molar ratio) and then adding a base (e.g., 6 M NaOH) to the aqueous solution until the pH of the aqueous solution is about 10 (e.g., pH 10) to form the hemoglobin/Fe$_3$O$_4$ composite, and recovering (e.g., using a magnet) the hemoglobin/Fe$_3$O$_4$ composite from the aqueous solution. The Fe$_3$O$_4$ is not formed separately before adding it to Hb, instead Hb is mixed with Fe$^{3+}$ and Fe$^{2+}$ salts solution before adding base. Thus, as the magnetite particles are being generated in solution, the Hb is already in solution. The process is generally conducted at room temperature and does not require temperatures above about 40° C. (e.g., 40° C.). In addition, the process does not require an activation step.

Other compounds may be added to the method or composite provided they do not substantially interfere with the intended activity and efficacy of the method or composite; whether or not a compound interferes with activity and/or efficacy can be determined, for example, by the procedures utilized below.

The amounts, percentages and ranges disclosed herein are not meant to be limiting, and increments between the recited amounts, percentages and ranges are specifically envisioned as part of the invention. All ranges and parameters disclosed herein are understood to encompass any and all subranges subsumed therein, and every number between the endpoints. For example, a stated range of "1 to 10" should be considered to include any and all subranges between (and inclusive of) the minimum value of 1 and the maximum value of 10 including all integer values and decimal values; that is, all subranges beginning with a minimum value of 1 or more, (e.g., 1 to 6.1), and ending with a maximum value of 10 or less, (e.g. 2.3 to 9.4, 3 to 8, 4 to 7), and finally to each number 1, 2, 3, 4, 5, 6, 7, 8, 9, and 10 contained within the range.

"Optional" or "optionally" means that the subsequently described event or circumstance may or may not occur, and that the description includes instances in which said event or circumstance occurs and instances where it does not. For example, the phrase "optionally comprising a defoaming agent" means that the composition may or may not contain a defoaming agent and that this description includes compositions that contain and do not contain a foaming agent. Also, by example, the phrase "optionally adding a defoaming agent" means that the method may or may not involve adding a defoaming agent and that this description includes methods that involve and do not involve adding a foaming agent.

By the term "effective amount" of a compound or property as provided herein is meant such amount as is capable of performing the function of the compound or property for which an effective amount is expressed. As will be pointed out below, the exact amount required will vary from process to process, depending on recognized variables such as the compounds employed and the processing conditions observed. Thus, it is not possible to specify an exact "effective amount." However, an appropriate effective amount may be determined by one of ordinary skill in the art using only routine experimentation.

Unless defined otherwise, all technical and scientific terms used herein have the same meaning as commonly understood by one of ordinary skill in the art to which the invention belongs. As used herein, the term "about" refers to a quantity, level, value or amount that varies by as much as 10% to a reference quantity, level, value or amount. Although any methods and materials similar or equivalent to those described herein can be used in the practice or testing of the present invention, the preferred methods and materials are now described.

The following examples are intended only to further illustrate the invention and are not intended to limit the scope of the invention as defined by the claims.

EXAMPLES

Materials: All chemicals used were analytical or ACS grade and used without further purification. Iron (II) sulfate heptahydrate, iron (III) sulfate hydrate, hemoglobin (from bovine blood, lyophilized powder), and the dyes (indigo carmine ($pK_a$=12.2), napthol blue black, tartrazine ($pK_a$=9.4), erythrosine ($pK_a$=4.1), eriochrome black T ($pK_a$=6.6 and 11.6), bromophenol blue ($pK_a$=4)) were purchased from Sigma Aldrich (Saint Louis, Mo.). Structures of these dyes are shown in FIG. 1. The hemoglobin used in this study was prepared from washed, lysed and dialyzed erythrocytes. Detailed description on the preparation and processing of the Hb can be found on the manufacturer's website.

Synthesis of hemoglobin/iron oxide composites (Hb/$Fe_3O_4$): Hb/$Fe_3O_4$ composite preparation was carried out by using chemical coprecipitation. In brief, an aqueous solution containing ferric and ferrous sulfate in 2:1 molar ratio was stirred continuously for about 15 min. Hb was then added to this aqueous solution, followed by dropwise addition of 6 M NaOH to raise the solution to a pH~10, under nitrogen atmosphere. The suspension was allowed to stand overnight. Next, Hb/$Fe_3O_4$ composite was recovered by centrifugation at 5000 g for 15 min. It was then washed repeatedly with water to bring the composite to a near neutral pH. The composite which was dark brown in color was surprisingly found to be attracted to an external magnet. Finally, the Hb/$Fe_3O_4$ composite was lyophilized and stored in a desiccator until needed.

Particle Size Distribution (PSD) and FTIR Analysis: The particle size and size distribution information, including the span, surface weighted mean size (D[3,2]), and the volume weighted mean size (D[4,3]) of the Hb/$Fe_3O_4$ composite were determined by using laser diffraction particle size analysis (Mastersizer 3000, Malvern Instruments, Worcestershire, UK). The Mastersizer 3000 instrument is capable of measuring particles from 0.01 to 3500 μm. The PSD was calculated using an absorbance of 0.2 and a refractive index of 2.42. The infrared spectra for Hb/$Fe_3O_4$ was determined using a Thermo Nicolet 6700 FT-IR (Thermo Electron Corporation, Madison, Wis.) spectrometer. Samples were ground with KBr and a hydraulic press was used to produce a KBr pellet of Hb/$Fe_3O_4$. The samples were run using a total of 64 scans from 4000 to 500 $cm^{-1}$.

Scanning electron microscope-energy dispersive X-ray spectroscopy (SEM-EDX): The samples were mounted on stubs and sputter-coated with gold (EMS 150R ES, EM Sciences, Hatfield, Pa.). The morphologies of Hb and Hb/$Fe_3O_4$ composite were studied using scanning electron microscope, FEI Quanta 200 F (Hillsboro, Oreg.) with an accelerating voltage of 10 kV in high vacuum mode. The elemental composition of the samples were also studied with an Oxford Xmax" 80 $mm^2$ detector (Oxford Instruments, Abingdon, UK). Spectra acquisition and interpretation were performed with AZtec software version 3.1 (Oxford Instruments, Abingdon, UK).

Thermogravimetric analysis (TGA): Thermal properties of the sample were studied using a TA Instruments Q500 thermal analyzer (TA Instruments, DE). The following parameters were used for sample analysis: temperature (ambient to 1000° C.), heating rate (20° C./min), balance purge flow (40 ml/min), sample purge flow (60 ml/min), and sample weight (~10 mg).

Adsorption test: In all the adsorption studies, a solution of dye with suspended adsorbent was gently mixed using a rotating mixer with excess equilibration time (24 h). For kinetics experiments (mass of adsorbent=50 mg, volume of solution=50 ml), aliquots were taken from 50 and 100 mg/L dye solutions at predefined time points. In isotherm studies (mass of adsorbent=40 mg, volume of solution=20 ml), varying dye concentrations (20-1000 mg/L) were used. For pH experiments, 20 mg of the adsorbent and 20 ml of a dye solution were employed. The pH of the solutions were varied from 4 to 9 using MES-Malic-Tris (MMT) buffer. The MMT buffer is a three buffer system that provides buffering over the entire pH range studied (Garcia, R. A., et al., Ind. Eng. Chem. Res., 53: 880-886 (2013)). The concentration of dye remaining in the supernatant was determined at its wavelength of maximum absorption. The adsorption capacity ($q_e$), the amount of dye (mg) removed per gram of adsorbent was calculated using:

$$q_e = \frac{(C_o - C_e)V}{m} \quad (1)$$

where $C_o$ and $C_e$ are the initial and equilibrium dye concentrations (mg/L) in solution, V is volume (L) of the dye solution, and m is the mass of adsorbent (g). All experiments were carried out in triplicate and the average results are presented unless otherwise stated.

Recyclability of Hb/$Fe_3O_4$ composite: Recyclability of the prepared composite was demonstrated following a recent protocol with slight modification (Essandoh, M., et al., Chem. Eng. J., 265: 219-227 (2015)). An adsorbent dose of 2 g/L was stirred gently with 20 mg/L of the dye solution. After equilibration, the Hb/$Fe_3O_4$ composite was removed from the suspension with an external magnet and then washed two to three times with 10 ml of methanol. The supernatant was analyzed by UV-vis spectrophotometry to determine the concentration of dye left in the solution. The Hb/Fe₃O₄ composite obtained was used for subsequent adsorption experiment to determine the recyclability of the prepared composite.

Results and Discussion. Synthesis of hemoglobin/iron oxide composite (Hb/Fe₃O₄): Several routes are available for the production of magnetic iron oxide. In this study, magnetic iron oxide intercalated with Hb was done using chemical coprecipitation. The general reaction scheme for the formation of the iron oxide can be shown as:

$$Fe^{2+} + 2Fe^{3+} + 8OH^- \rightarrow Fe_3O_4 + 4H_2O \quad (2)$$

This technique may be the simplest technique and large amounts of the iron oxide can be produced (Laurent, S., et al., Chem. Rev., 108: 2064-2110 (2008)). The solid particles generated comprise iron oxide nanoparticles dispersed in a matrix of Hb. The nature of the attachment between iron oxide and Hb is not known, but, without being bound by theory, it is likely dominated by electrostatic and hydrophobic attraction (Shemetov, A. A., et al., ACS Nano, 6: 4585-4602 (2012)). It is worth noting that the composite particles were surprisingly strongly magnetic, did not dissociate under the conditions used in the study, and they could be removed easily from the suspension using an external magnet.

Figure 2A:
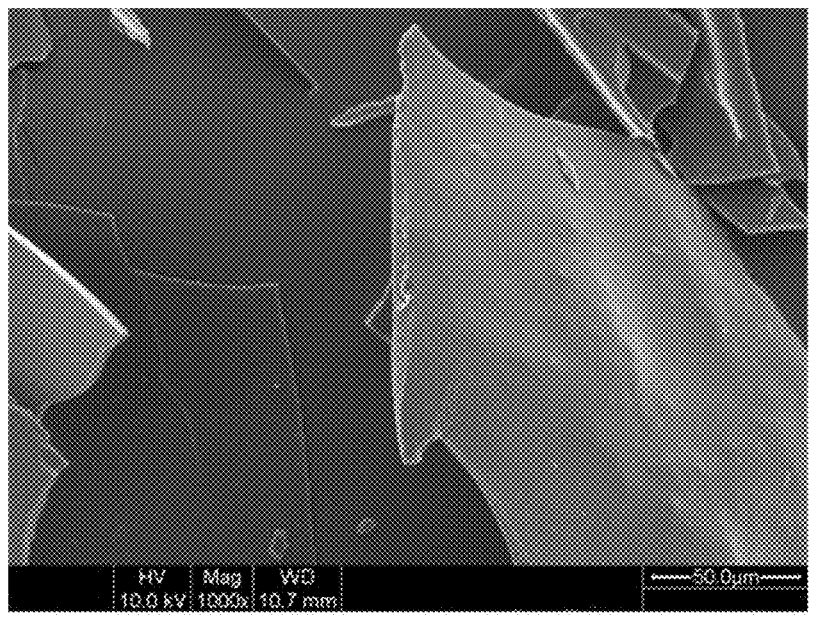
FIG. 2A shows SEM (scanning electron microscope) images of unmodified Hb and FIG. 2B shows SEM images of Hb/Fe$_3$O$_4$ composite as described below.
Figure 2B:
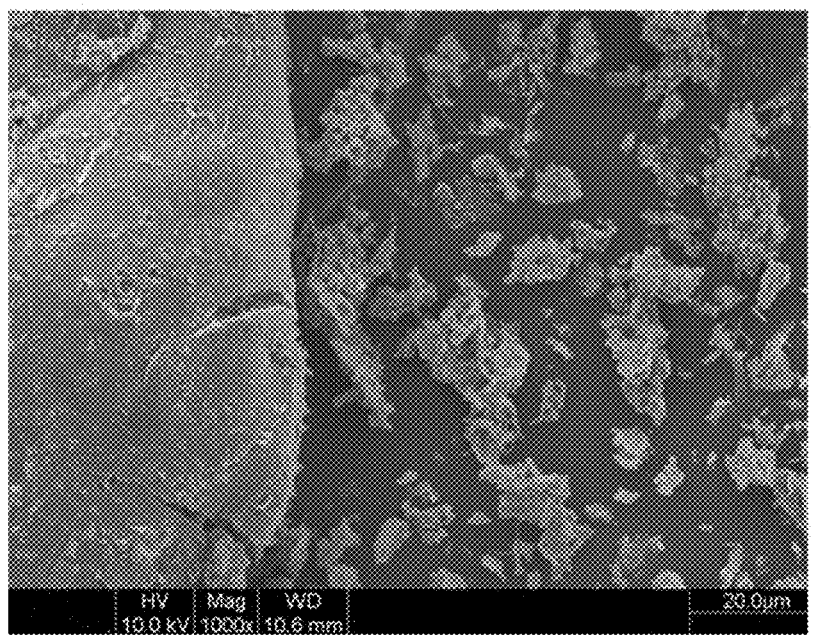

SEM-EDX: Scanning electron microscope (SEM) was used to study the morphology of Hb before and after magnetization. SEM images of Hb and Hb/Fe₃O₄ composite are shown in FIG. 2A and FIG. 2B respectively. Smooth, flat plates were seen with the pure Hb sample (FIG. 2A). In the case of Hb/Fe₃O₄ composite, iron oxides were clearly seen on the surface of flat plates of Hb (FIG. 2B). These iron oxides were formed when sodium hydroxide was added to the aqueous solution containing the iron (II) and (III) salts and the Hb as described above. The micrographs also showed significant differences in the distribution of iron oxide intercalated on the smooth flat layers of the Hb sample. An iron weight percent of 0.16 and 9.50 were obtained for Hb and Hb/Fe₃O₄ composite, respectively, using elemental analysis by SEM-EDX.

Figure 3A:
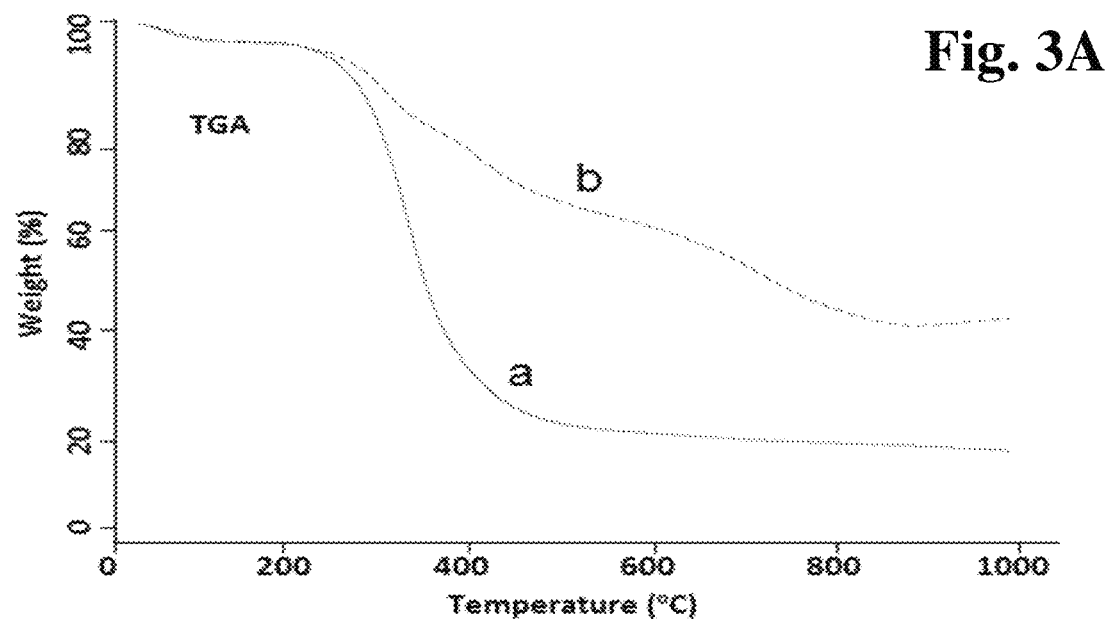
FIG. 3A shows TGA-DTA (thermal gravimetric analysis and differential thermal analysis) graph of Hb and FIG. 3B shows TGA-DTA graph of Hb/Fe$_3$O$_4$ composite as described below.
Figure 3B:
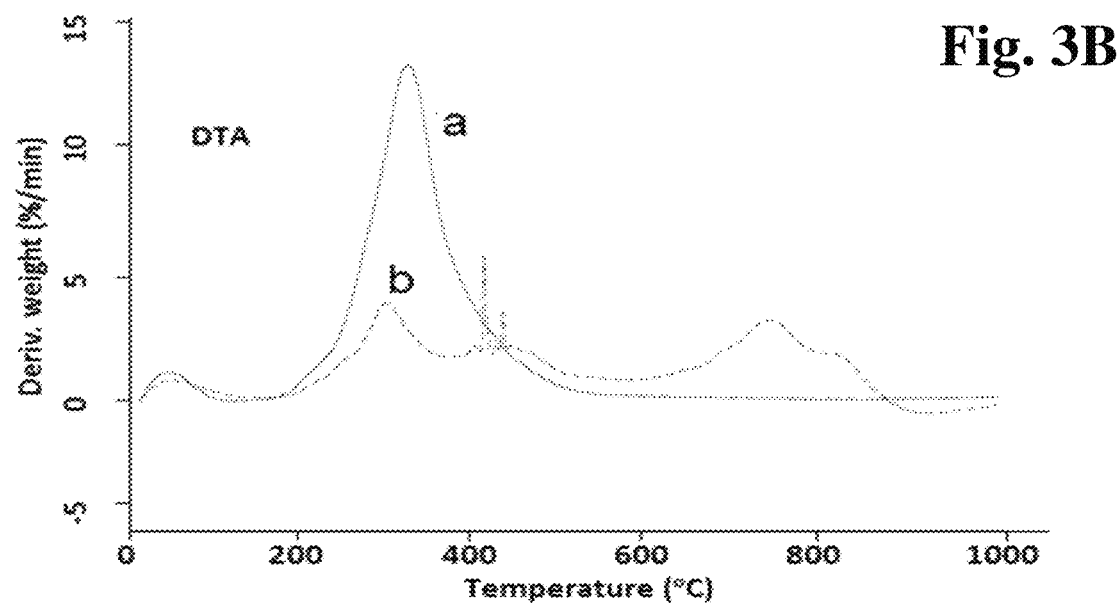

Thermogravimetric analysis (TGA): FIG. 3A and FIG. 3B shows the TGA-DTA (thermal gravimetric analysis and differential thermal analysis) curve from ambient to 1000° C. for Hb and Hb/Fe₃O₄ composite respectively. Pure Hb (TGA curve) lost about 10% of its weight up to 200° C., then exhibited approximately 65% weight loss from 200 to 500° C., followed by just 5% reduction in weight from 500 to 1000° C. The Hb/Fe₃O₄ composite also showed about 10% decrease in weight at 200° C. followed by a gradual decrease in weight up to 1000° C. The total weight loss at 1000° C. was 80 and 60%, for pure Hb and the Hb/Fe₃O₄ composite, respectively. These results indicated that the thermal stability of the Hb/Fe₃O₄ composite was surprisingly higher than the native Hb. DTA curve showed a derivative peak loss at a temperature less than 100° C. and at 327° C. due to the evaporation of physically adsorbed water and the decomposition of Hb sample. A derivative peak was seen at 298° C. and around 740° C. for Hb/Fe₃O₄ composite sample, which was ascribed to hematite-type impurity present in the magnetite sample and the reduction of magnetite (Fe₃O₄) to metallic iron or to lower oxidation state oxide, respectively (Jozwiak, W. K., Appl. Catal. A-Gen., 326: 17-27 (2007)).

Adsorption test: To understand the adsorption kinetics, both the pseudo-first and second order models were investigated. The linear form of pseudo-first order equation (Lagergren, S., Zur theorie der sogenannten adsorption geloster stoffe, K. Sven. Vetenskapsakad. Handl., 24: 1-39 (1898)) was calculated from:

$$\log(q_e - q_t) = \log q_e - \frac{k_s t}{2.303} \quad (3)$$

where, $q_e$ and $q_t$ are the amount adsorbed at equilibrium and at time "t", respectively, and $k_1$ is the first order rate constant. Correlation coefficients, experimental and calculated $q_e$ values obtained when the experimental data are fitted to equation 3 are shown in Table 1. Experimental and calculated $q_e$ values varied widely, an indication that the data does not follow the pseudo-first order kinetics.

The linear form of pseudo-second order equation (Ho, Y.-S., J. Hazard. Mater., 136: 681-689 (2006)) was calculated from:

$$\frac{t}{q_t} = \frac{1}{k_2 q_e^2} + \frac{t}{q_e} \quad (4)$$

The parameters used in equation 4 has the same meaning as those in equation 3, except that $k_2$ is the second order rate constant. Table 1 also displays the parameters obtained for the pseudo-second order model. There is a close agreement between the experimental and calculated $q_e$ values, coupled with high correlation coefficients ranging from 0.994 to 1. The results clearly showed that the pseudo-second order model, based on the assumption that the rate-limiting step is chemisorption, best fits the experimental data.

Adsorption isotherm typically describes the equilibrium concentration of adsorbate on adsorbent. The adsorption isotherms were obtained in batch mode by adding a fixed amount of adsorbent (40 mg) to varying concentrations of the dyes (20-1000 mg/L) at room temperature until equilibration (24 h) was achieved. The results obtained were fitted to the well-known Freundlich and Langmuir isotherm models. The Freundlich isotherm model (Freundlich, H., J. Phys. Chem., 57: 385-471 (1906)) is based on the assumption that the amount of adsorbate adsorbed per unit gram of adsorbent is directly proportional to the pressure at constant temperature. This isotherm takes into account the heterogeneity of adsorption sites. The Freundlich isotherm parameters were calculated using:

$$\log q_e = \log k_f + \frac{1}{n} \log C_e \quad (5)$$

where $k_f$ and $1/n$ represent the Freundlich adsorptive capacity and adsorption intensity, respectively. The Langmuir isotherm assumes a homogenous surface with monolayer coverage and no interaction of the adsorbate with neighboring sites (Langmuir, I., J. Am. Chem. Soc., 40: 1361-1403 (1918)). The Langmuir isotherm parameters were calculated using:

$$\frac{C_e}{q_e} = \frac{C_e}{Q^o} + \frac{1}{bQ^o} \quad (6)$$

where b is a constant related to the net enthalpy from the Langmuir isotherm (L/mg) and $Q^o$ is the monolayer adsorption capacity (mg/g).

Figure 4:
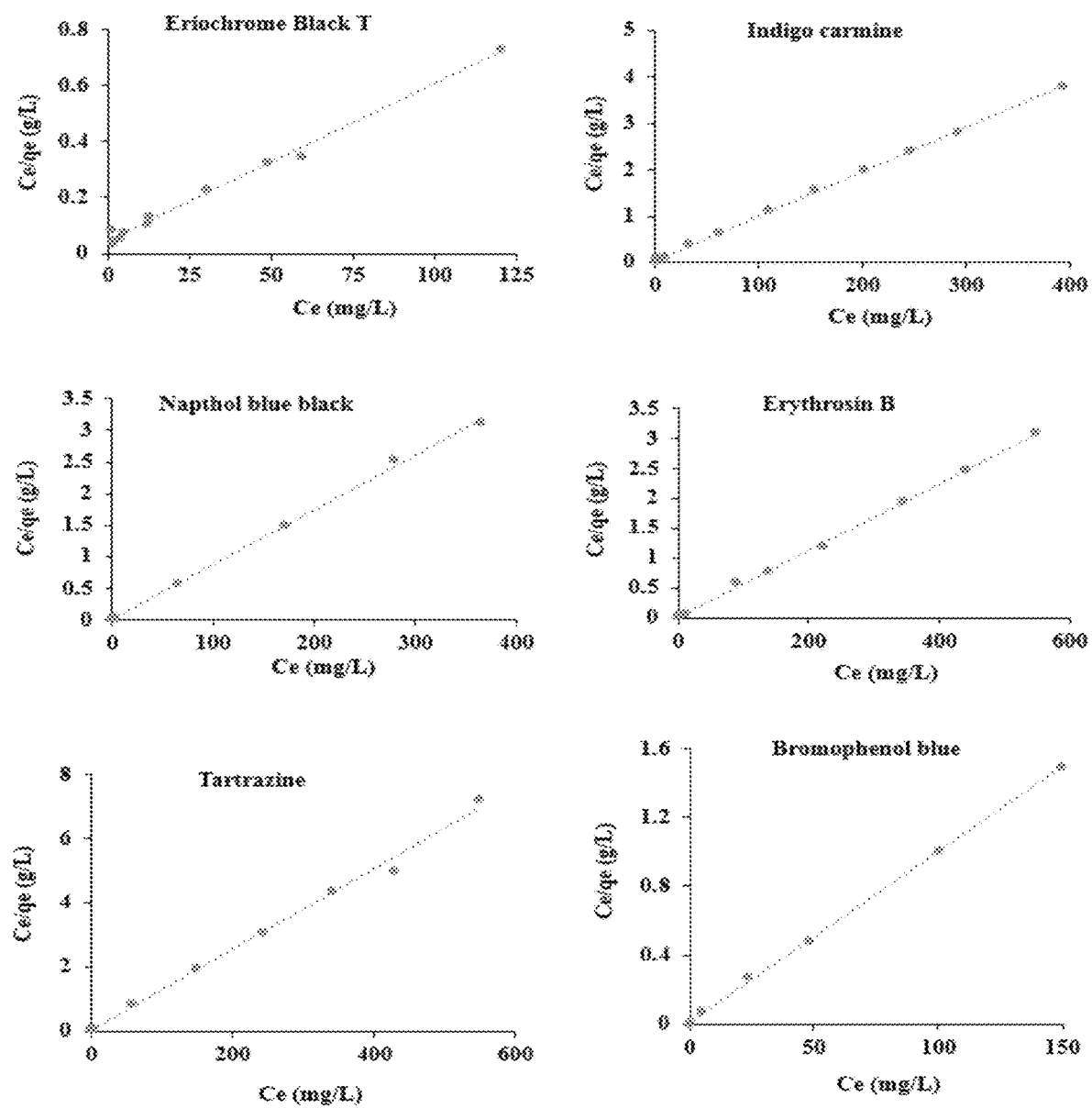
FIG. 4 shows Langmuir fittings to the experimental data for eriochrome black T, indigo carmine, naphthol blue black, erythrosine, tartrazine and bromophenol blue. Experimental conditions: mass of adsorbent (40 mg), volume of dye solution (20 ml), concentration of dye solutions (20-1000 mg/L), and equilibration time (24 h) as described below.

The isotherm parameters and correlation coefficients obtained from the linear analysis are shown in Table 2. The results showed that the Langmuir adsorption isotherm surprisingly fits the experimental data better compared to the Freundlich isotherm as exhibited by the high correlation coefficient ($R^2 > 0.990$). The Langmuir adsorption isotherms determined by linear analysis are shown in FIG. 4. The maximum monolayer adsorption capacities were found to be 178.57, 104.17, 114.94, 80, 178.57, and 101 mg/g for eriochrome black T, indigo carmine, naphthol blue black, tartrazine, erythrosine and bromophenol blue, respectively. A number of researches have used different adsorbents to remove various hazardous organic dyes from aqueous solutions. Table 3 compares our Langmuir adsorption capacities in this study with other adsorbents that have been reported by different authors for the removal of dyes from aqueous solution. These results clearly depict that that the amount of dye (mg) remove per gram of adsorbent employed in this study was surprisingly better than most adsorbents that have been utilized to remove various dyes. The $Hb/Fe_3O_4$ was surprisingly very effective for the removal of all the six tested dyes, although their adsorption capacities differ. Thus, the synthesized composite can be used as a suitable adsorbent for the removal of different dyes from industrial effluents.

Figure 5:
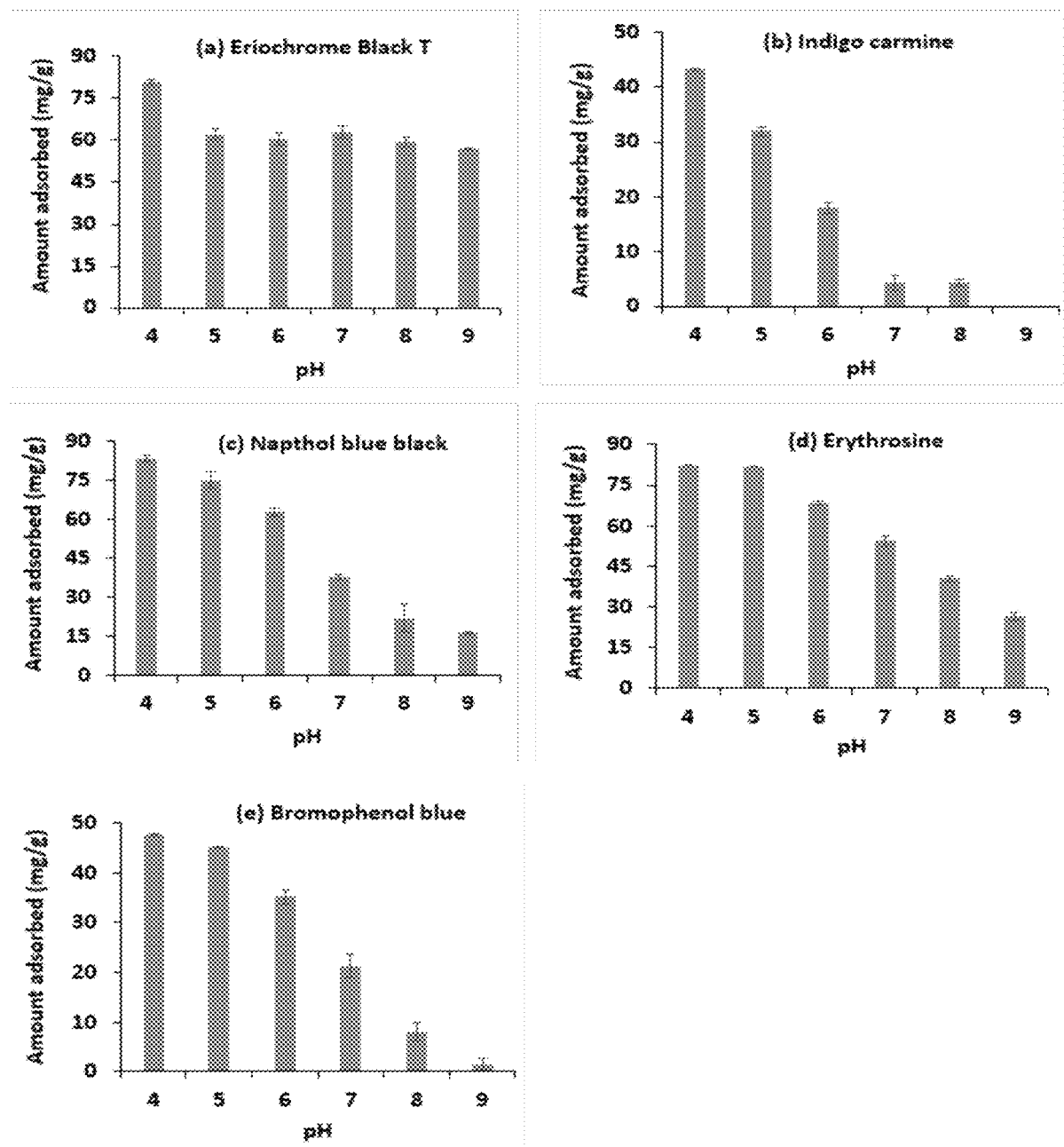
FIG. 5 shows the effect of solution pH for the adsorption of eriochrome black T, indigo carmine, naphthol blue black, erythrosine and bromophenol blue onto Hb/Fe$_3$O$_4$ composite. Experimental conditions: mass of adsorbent (20 mg), volume of dye solution (20 ml), equilibration time (24 h) and concentration of dye solutions (83 mg/L for eriochrome black T, erythrosine and naphthol blue black; 48 mg/L for indigo carmine and bromophenol blue) as described below.

The effect of solution pH on the adsorption of the different dyes are shown in FIG. 5. The isoelectric point (pI) for the $Hb/Fe_3O_4$ was determined using a zeta potential instrument (Zetasizer Nano Z, Malvern, Westborough, Mass.) was found to be ~6.2 (not shown for brevity). Generally, the adsorption of the dyes were found to decrease with increasing solution pH except eriochrome black T which was pH independent in the range pH 5-9. At pH less than the pI of $Hb/Fe_3O_4$ (~6.2), the adsorbent surface was positively charged. This reduced any electrostatic repulsion between the $Hb/Fe_3O_4$ and the dyes (undissociated form), resulting in enhanced adsorption. It was therefore not surprising that the amount adsorbed (mg/g) within this region (pH 4-5) was high. These results are consistent with the work done by Al-Degs et al. (Al-Degs, Y. S., Dyes Pigments, 77: 16-23 (2008)) where an increase in the percentage removal of dyes were observed at low solution pH.

However, at high pH values, greater than the pI of the $Hb/Fe_3O_4$, the adsorbent surface was negatively charged while the dyes are negatively charged (at $pH > pK_a$). At these high pH values, the adsorption capacities were greatly reduced mainly as a result of electrostatic repulsion between the adsorbent and the dyes. The mechanism of adsorption between the adsorbent and the dyes were, without being bound by theory, likely governed by electrostatic interaction, although van der Waals interaction and hydrophobic interaction may also have played a role. Other authors have also observed a similar trend whereby an increase in initial solution pH led to a decrease in the removal of dyes from aqueous solution (Robati, D., et al., Chem. Eng. J., 284: 687-697 (2016)). It is paramount for one to recognize that the surface charge of both the adsorbent and adsorbate dyes are complex functions of pH, and the adsorbates also ionize at different pHs, and this can greatly contribute to the variation in the amount adsorbed as the initial solution pH changes (Essandoh, M., et al., Chem. Eng. J., 265: 219-227 (2015)).

Figure 6:
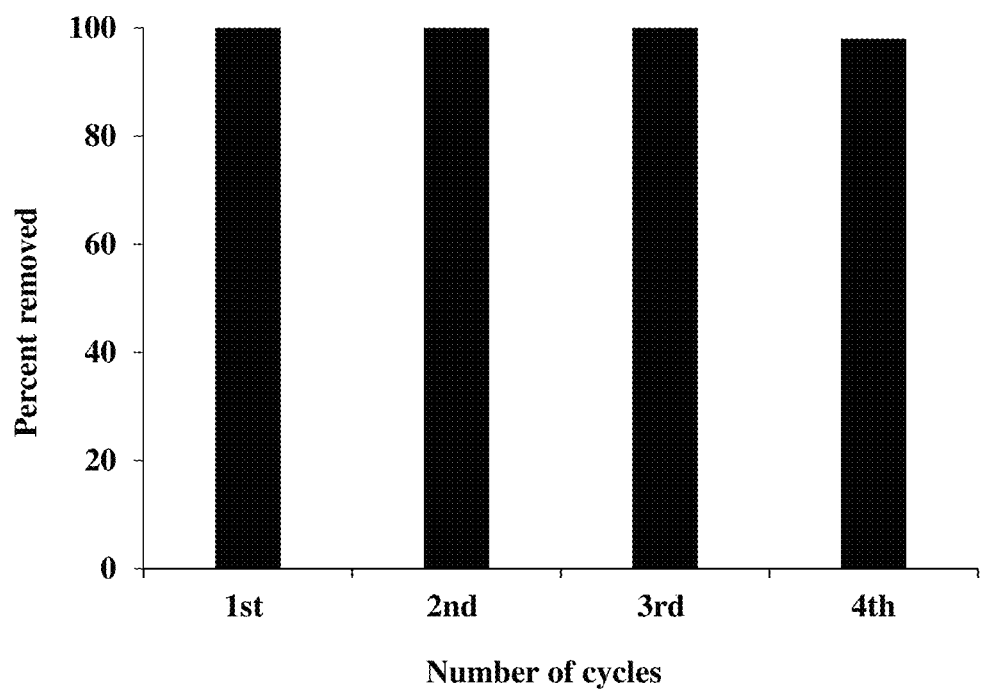
FIG. 6 shows bromophenol blue adsorption-desorption studies onto Hb/Fe$_3$O$_4$ composite. Experimental conditions: adsorbent dose (2 g/L), concentration of dye solution (20 mg/L), equilibration time (24 h) as described below.

Reusability of $Hb/Fe_3O_4$ composite: For industrial application, the ability to recover and reuse the $Hb/Fe_3O_4$ may be a major advantage. The composite particles were strongly magnetic, and they could be removed easily from the suspension using an external magnet. Thus, the used adsorbent can be eliminated from the treated water with minimal processing expense. The recovering of the $Hb/Fe_3O_4$ composite following its adsorption was demonstrated with bromophenol blue dye by washing with methanol to remove the adsorbed dye. Even after four adsorption and regeneration cycles, the adsorption capacity surprisingly decreased by only 2% of its initial capacity (FIG. 6). The recovery and reusability of $Hb/Fe_3O_4$ composite is an added advantage and an indication that the composite can be used repeatedly to effectively remove pollutant from water/wastewater streams.

Figure 7:
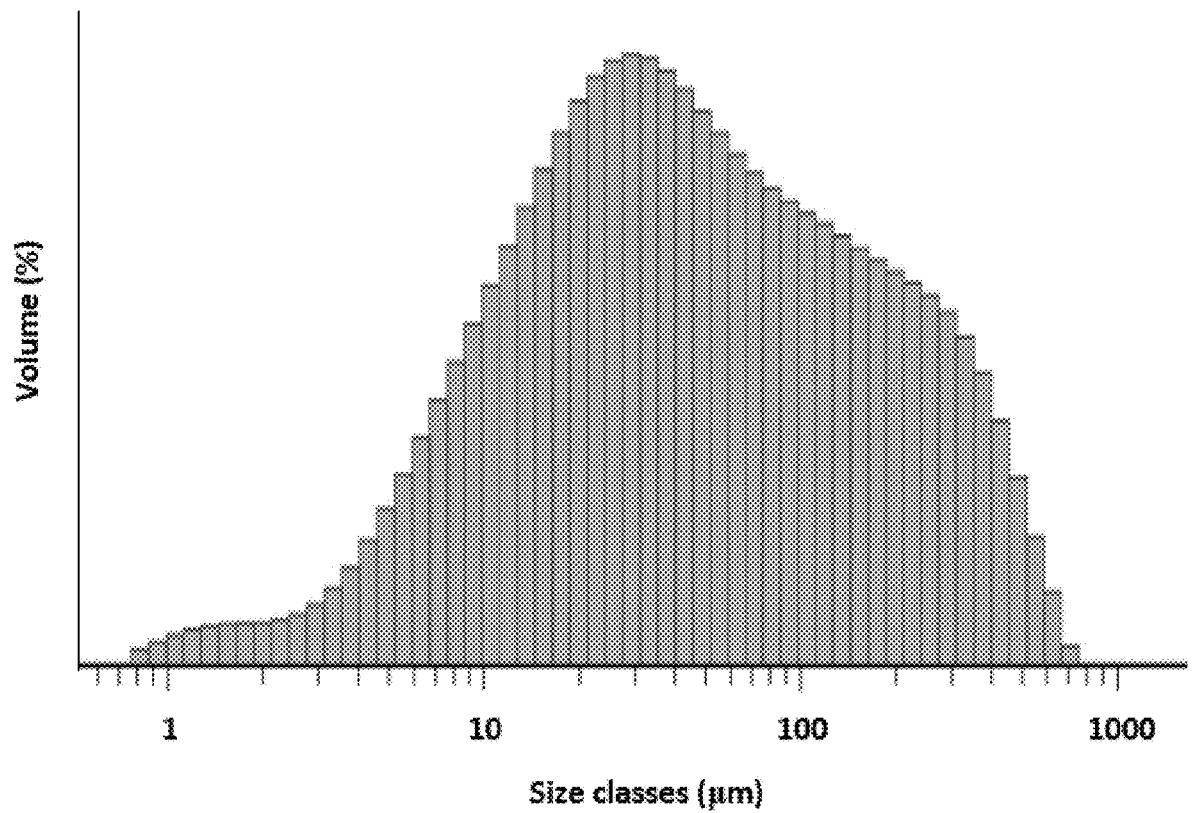
FIG. 7 shows the particle size distribution of Hb/Fe$_3$O$_4$ composite as described below.
Figure 8:
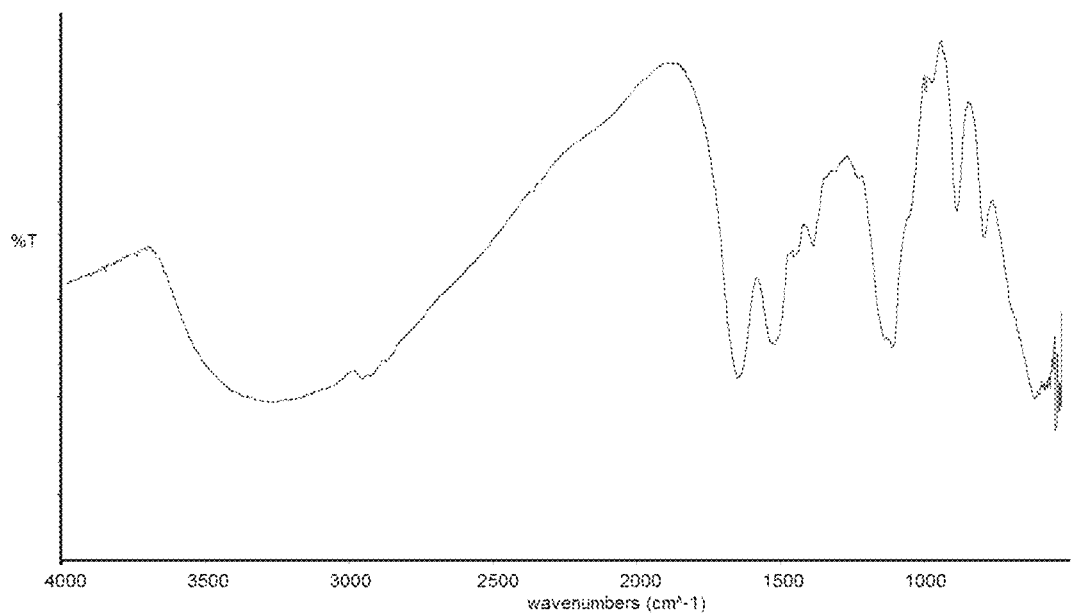
FIG. 8 shows Fourier Transform Infrared Spectroscopy (FTIR) spectra of Hb/Fe$_3$O$_4$ composite as described below.

Further characterization of the composites. FTIR and Particle Size Distribution Analysis: FIG. 7 depicts the particle size distribution of the synthesized adsorbent. The volume weighted mean diameter of the adsorbent was found to be 92.57 μm. The span, which depicts the distribution width was 6.05. The D (v, 0.1), D (v, 0.5) and D (v, 0.9) indicated that 10, 50, and 90% of the sample mass distribution lies below this value and were to found to be 7.89, 41.77, 260.33 μm, respectively. The FTIR spectra for $Hb/Fe_3O_4$ composite is shown in FIG. 8. The peak around 570 $cm^{-1}$ was due to Fe—O bonds in the lattice of magnetite. The O—H in-plane and out-of-plane peaks occur at 1460 and 930 $cm^-$, respectively. The band at 1100 $cm^{-1}$ arises from C—O single bond stretching. The maximum at 1690 $cm^{-1}$ corresponds to the C=O stretch while the band at 3300 $cm^{-1}$ was due to the existence of N—H stretch. These results are consistent with a material containing both iron oxide and protein (Ai, L., et al., J. Hazard. Mater., 198: 282-290 (2011); Kong, J., et al., Acta Biochim. Biophys. Sinica, 39: 549-559 (2007)).

Conclusions: We have demonstrated the synthesis of $Hb/Fe_3O_4$ composite through chemical coprecipitation. The samples were characterized using spectroscopic, microscopic, and thermal analysis techniques, and the techniques showed a difference between the native Hb and the synthesized $Hb/Fe_3O_4$ composite. The $Hb/Fe_3O_4$ composite surprisingly exhibited more thermal stability than the native Hb. The adsorption was found to decrease with pH except eriochrome black T which was pH independent from pH 5-9. Adsorption of dyes onto the adsorbent was surprisingly found to follow pseudo-second order kinetic model and the Langmuir adsorption isotherm. Surprisingly, the composites were easily isolated from aqueous suspension using an external magnet, and its reusability was also demonstrated without any significant loss (~2%) in the initial adsorption capacity. The fascinating properties of this synthesized $Hb/Fe_3O_4$ composite can further be exploited in different ways for environmental applications.

All of the references cited herein, including U.S. patents and U.S. patent application Publications, are incorporated by reference in their entirety. Also incorporated by reference in their entirety are the following references: You, L., et al., J. Colloid Interface Sci., 300: 526-535 (2006); Haider, S., et al., Chem. Eng. Res. Des., 89: 23-28 (2011); de Oliveira Brito, S. M., J. Hazard. Mater., 174: 84-92 (2010); Lakshmi, U. R., et al., J. Environ. Manage., 90: 710-720 (2009); Gutierrez-Segura, E., et al., J. Hazard. Mater., 170: 1227-1235 (2009); Safarikova, M., et al., Chemosphere, 59: 831-835 (2005); Galan, J., et al., Chem. Eng. J., 219: 62-68 (2013); Goscianska, J., and R. Pietrzak, Catal. Today, 249: 259-264 (2015); Mittal, A., et al., J. Hazard. Mater., 146 (2007) 243-248 (2007); Sahen, O., et al., J. Ind. Eng. Chem., 19: 1617-1623 (2013); Moeinpour, F., et al., J. Environ. Health Sci. Eng., 12: 112 (2014); Mittal, A., et al., J. Hazard. Mater., 138: 95-105 (2006); Gupta, V. K., et al., J. Colloid Interface Sci., 304: 52-57 (2006); Dhananasekaran, S., et al., J. Adv. Res., 7: 113-124 (2016); Yang, N., et al., Mater. Lett. 62: 645-647 (2008); Gong, J.-L., et al., J. Hazard. Mater., 164: 1517-1522 (2008); Tanhaei, B., et al., Chem. Eng. J., 259: 1-10 (2015); Weber, E. J., and V. C. Stickney, Water Res., 27: 63-67 (1993); Clarke, E. A., and R. Anliker, Organic Dyes and Pigments, IN Anthropogenic Compounds, 1980, Springer Berlin Heidelberg: Berlin, Heidelberg. p. 181-215; You, L., et al., J. Colloid Interface Sci. 300 (2006) 526-535 (2006).

Thus, in view of the above, there is described (in part) the following:

A method to remove organic and/or inorganic compounds from water containing said organic and/or inorganic compounds, said method comprising (or consisting essentially of or consisting of) contacting said water with an effective organic and/or inorganic compounds removing amount of hemoglobin/$Fe_3O_4$ composite where said compounds in said water adsorb onto said hemoglobin/$Fe_3O_4$ composite, and removing said hemoglobin/$Fe_3O_4$ composite from said water.

The above method, wherein said organic and/or inorganic compounds are organic dyes. The above method, wherein said organic dyes are azo dyes, diazo dyes, arylmethane dyes, xanthene dyes, indole dyes, or mixtures thereof.

The above method, wherein said water containing said organic and/or inorganic compounds has a pH of about 4 to about 9.

The above method, wherein at least 95% of the initial concentration of said organic and/or inorganic compounds are removed from said water.

The above method, wherein Hb/$Fe_3O_4$ is the sole adsorbent.

The above method, wherein said hemoglobin/$Fe_3O_4$ composite is prepared by a process comprising (or consisting essentially of or consisting of) adding hemoglobin to an aqueous solution containing $Fe^{3+}$ and $Fe^{2+}$ salts and then adding a base to said aqueous solution until the pH of said aqueous solution is about 10 to form said hemoglobin/$Fe_3O_4$ composite, and recovering said hemoglobin/$Fe_3O_4$ composite from said aqueous solution.

The term "consisting essentially of" excludes additional method (or process) steps or composition components that substantially interfere with the intended activity of the method (or process) or composition, and can be readily determined by those skilled in the art (for example, from a consideration of this specification or practice of the invention disclosed herein). The invention illustratively disclosed herein suitably may be practiced in the absence of any element which is not specifically disclosed herein.

Other embodiments of the invention will be apparent to those skilled in the art from a consideration of this specification or practice of the invention disclosed herein. It is intended that the specification and examples be considered as exemplary only, with the true scope and spirit of the invention being indicated by the following claims.

TABLE 1

Pseudo-first and second order kinetic parameters for dye adsorption onto Hb/$Fe_3O_4$ composite

| | | Pseudo-first order parameters | | | | Pseudo-second order parameters | | | |
|---|---|---|---|---|---|---|---|---|---|
| Dye | Initial conc. (mg/L) | $q_e$, exp. (mg/g) | $q_e$, calc. (mg/g) | $k_1$ (mg/g) | $R^2$ ($gmg^{-1}h^{-1}$) | $q_e$, exp. | $q_e$, calc. (mg/g) | $k_2$ (mg/g) | $R^2$ ($gmg^{-1}h^{-1}$) |
| IC | 50 | 47.54 | 11.20 | 0.61 | 0.986 | 47.54 | 47.84 | 0.17 | 1.000 |
|  | 100 | 69.10 | 11.68 | 0.41 | 0.998 | 69.10 | 69.44 | 0.11 | 1.000 |
| BB | 50 | 49.54 | 11.65 | 0.58 | 0.988 | 49.54 | 49.75 | 0.16 | 1.000 |
|  | 100 | 78.37 | 13.05 | 0.45 | 0.946 | 78.37 | 79.37 | 0.04 | 0.999 |
| NBB | 50 | 49.61 | 13.05 | 0.45 | 0.946 | 49.61 | 50.00 | 0.10 | 1.000 |
|  | 100 | 94.10 | 44.00 | 0.27 | 0.979 | 94.10 | 96.15 | 0.02 | 0.999 |
| TT | 50 | 46.25 | 7.53 | 0.53 | 0.935 | 46.25 | 46.51 | 0.22 | 1.000 |
|  | 26 | 25.63 | 1.35 | 0.19 | 0.623 | 25.63 | 25.71 | 0.54 | 1.000 |
| EB | 50 | 49.89 | 3.09 | 0.78 | 0.946 | 49.89 | 50.00 | 0.80 | 1.000 |
|  | 100 | 99.76 | 24.21 | 0.52 | 0.957 | 99.76 | 100 | 0.07 | 1.000 |
| EBT | 50 | 49.85 | 15.96 | 0.56 | 0.995 | 49.85 | 50.25 | 0.11 | 1.000 |
|  | 100 | 97.63 | 49.66 | 0.12 | 0.867 | 97.63 | 102 | 0.01 | 0.994 |

TABLE 2

Freundlich and Langmuir isotherm parameters for dye adsorption onto Hb/$Fe_3O_4$

| | | BB | EB | NBB | TT | IC | EBT |
|---|---|---|---|---|---|---|---|
| Freundlich | $K_f$ (mg/g) | 56.60 | 35.92 | 35.28 | 23.01 | 21.44 | 25.16 |
| | $1/n$ | 0.130 | 0.298 | 0.236 | 0.224 | 0.315 | 0.478 |
| | $R^2$ | 0.988 | 0.680 | 0.627 | 0.752 | 0.682 | 0.828 |
| Langmuir | $Q°$ (mg/g) | 101.00 | 178.57 | 114.94 | 80.00 | 104.17 | 178.57 |
| | b | 0.839 | 0.272 | 0.551 | 0.360 | 0.166 | 0.122 |
| | $R^2$ | 0.999 | 0.999 | 0.999 | 0.995 | 0.999 | 0.992 |

TABLE 3

Comparison of adsorption capacities of different adsorbents for dye removal from aqueous solution.

| Adsorbent | Dye | Adsorption capacity (mg/g) | Reference |
|---|---|---|---|
| Mesoporous hybrid gel | Bromophenol blue | 17.69 | Hashem et al. 2007 |
| α-Chitin nanoparticle | Bromophenol blue | 27.72 | Chequer et al. 2013 |

TABLE 3-continued

Comparison of adsorption capacities of different adsorbents for dye removal from aqueous solution.

| Adsorbent | Dye | Adsorption capacity (mg/g) | Reference |
|---|---|---|---|
| Hb-Fe$_3$O$_4$ composite | Bromophenol blue | 101.00 | This study |
| Evacuated granular charcoal | Bromophenol blue | 101.62 | Weber and Stickney 1993 |
| Nut shell | Indigo carmine | 1.09 | Merna and Arivoli 2007 |
| Rice husk ash | Indigo carmine | 29.28 | Nigam et al. 2000 |
| Fe— Zeolitic tuff | Indigo carmine | 32.83 | Robinson et al. 2001 |
| Carbonaceous material | Indigo carmine | 92.83 | Robinson et al. 2001 |
| Hb-Fe$_3$O$_4$ composite | Indigo carmine | 104.17 | This study |
| Magnetic brewer's yeast | Naphthol blue black | 11.60 | Robati et al. 2016 |
| Hb-Fe$_3$O$_4$ composite | Naphthol blue black | 114.94 | This study |
| Mesoporous carbon | Naphthol blue black | 270.00 | Dhananasekaran et al. 2016- |
| Multi-walled carbon nanotube | Tartrazine | 53.01 | Gautam et al. 2015 |
| Hen feathers | Tartrazine | 64.00 | Lesins, V., and E. Ruckenstein, Colloid. Polym. Sci., 266: 1187-1190 (1988) |
| Hb-Fe$_3$O$_4$ composite | Tartrazine | 80.00 | This study |
| Activated carbon biosorbent | Tartrazine | 90.90 | Del Hoyo et al. 2007 |
| Almond shell | Eriochrome black T | 6.02 | Neuberger et al. 2005 |
| Cold plasma treated almond shell | Eriochrome black T | 18.18 | Neuberger et al. 2005 |
| Microwave treated almond shell | Eriochrome black T | 29.41 | Neuberger et al. 2005 |
| NiFe$_2$O$_4$ nanoparticles | Eriochrome black T | 47.00 | Diez et al. 2012 |
| Hb-Fe$_3$O$_4$ composite | Eriochrome black T | 178.57 | This study |
| De-oiled soya | Erythrosine | 10.79 | Reiss and Hutten 2005 |
| Hen feathers | Erythrosine | 20.78 | Lee et al. 2013 |
| Bottom ash | Erythrosine | 21.28 | Reiss and Hutten 2005 |
| Hb-Fe$_3$O$_4$ composite | Erythrosine | 178.57 | This study |

We claim:

1. A method to remove organic dyes from water containing said organic dyes, said method comprising contacting said water with an effective organic dyes removing amount of hemoglobin/Fe$_3$O$_4$ composite where said organic dyes in said water adsorb onto said hemoglobin/Fe$_3$O$_4$ composite, and removing said hemoglobin/Fe3O4 composite from said water; wherein at least 95% of the initial concentration of said organic dyes are removed from said water; and wherein said hemoglobin/Fe$_3$O$_4$ composite is prepared by a process comprising adding hemoglobin to an aqueous solution containing Fe$^{3+}$ and Fe$^{2+}$ salts and then adding a base to said aqueous solution until the pH of said aqueous solution is about 10 to form said hemoglobin/Fe$_3$O$_4$ composite, and recovering said hemoglobin/Fe$_3$O$_4$ composite from said aqueous solution; wherein said organic dyes are azo dyes, diazo dyes, arylmethane dyes, xanthene dyes, indole dyes, or mixtures thereof.

2. The method according to claim 1, wherein said water containing said organic dyes has a pH of about 4 to about 9.

3. A method to remove organic dyes from water containing said organic dyes, said method comprising contacting said water with an effective organic dyes removing amount of hemoglobin/Fe$_3$O$_4$ composite where said organic dyes in said water adsorb onto said hemoglobin/Fe$_3$O$_4$ composite, and removing said hemoglobin/Fe$_3$O$_4$ composite from said water; wherein at least 95% of the initial concentration of said organic dyes are removed from said water; wherein said organic dyes are selected from the group consisting of eriochrome black T, indigo carmine, naphthol blue black, tartrazine, erythrosine and bromophenol blue; and wherein said hemoglobin/Fe$_3$O$_4$ composite is prepared by a process comprising adding hemoglobin to an aqueous solution containing Fe$^{3+}$ and Fe$^{2+}$ salts and then adding a base to said aqueous solution until the pH of said aqueous solution is about 10 to form said hemoglobin/Fe$_3$O$_4$ composite, and recovering said hemoglobin/Fe$_3$O$_4$ composite from said aqueous solution.

* * * * *